US012807004B2

(12) United States Patent
Figan et al.

(10) Patent No.: US 12,807,004 B2
(45) Date of Patent: Nov. 24, 2026

(54) LOCKING DEVICE FOR A PANTOGRAPH

(71) Applicant: Schunk Transit Systems GmbH, Wettenberg (DE)

(72) Inventors: Alexandru-Ioan Figan, Herdorf (DE); Martin Sommer, Weimar (DE); Frederic Gros, Wetzlar (DE)

(73) Assignee: SCHUNK TRANSIT SYSTEMS GMBH, Wettenberg (DE)

( * ) Notice: Subject to any disclaimer, the term of this patent is extended or adjusted under 35 U.S.C. 154(b) by 632 days.

(21) Appl. No.: 18/355,193

(22) Filed: Jul. 19, 2023

(65) Prior Publication Data

US 2024/0025262 A1 Jan. 25, 2024

(30) Foreign Application Priority Data

Jul. 21, 2022 (EP) .................................... 22186313

(51) Int. Cl.

| | |
|---|---|
| ***B60L 5/39*** | (2006.01) |
| ***B60L 5/24*** | (2006.01) |
| ***B60L 5/28*** | (2006.01) |
| ***B60L 5/38*** | (2006.01) |
| *B60M 1/30* | (2006.01) |

(52) U.S. Cl.

CPC *B60L 5/39* (2013.01); *B60L 5/24* (2013.01); *B60L 5/28* (2013.01); *B60L 5/38* (2013.01); *B60M 1/30* (2013.01)

(58) Field of Classification Search

CPC ...... B60L 5/24; B60L 5/39; B60L 5/38; B60L 5/28; B60L 2200/26

See application file for complete search history.

(56) References Cited

U.S. PATENT DOCUMENTS

| | | | | | |
|---|---|---|---|---|---|
| 1,487,311 | A * | 3/1924 | Bower | B60L 5/16 191/85 |
| 4,413,710 | A * | 11/1983 | Milleville | B60L 5/28 191/88 |
| 2024/0042866 | A1* | 2/2024 | O'Halloran | B60L 5/04 |

FOREIGN PATENT DOCUMENTS

| | | | | |
|---|---|---|---|---|
| CN | 202071702 | U * | 12/2011 | |
| ES | 2344286 | A1 * | 8/2010 | B61F 19/00 |
| FR | 2458506 | A3 * | 1/1981 | B60L 5/38 |
| GB | 422006 | A * | 1/1935 | B60L 5/24 |
| JP | S5232812 | U | 3/1977 | |
| KR | 20190077719 | A * | 7/2019 | B60L 5/39 |

* cited by examiner

*Primary Examiner* — Cheng Lin

(74) *Attorney, Agent, or Firm* — Quarles & Brady LLP

(57) ABSTRACT

A locking device for securing a contact strip device of a current collector in a storage position, the contact strip device being movable between a storage and sliding contact position relative to a conductor rail. The locking device has a cam, a rotatably mounted shaft and an anti-rotation device, the cam disposed on the shaft in a rotationally fixed manner and the cam movable from a release to locking position by rotation of the shaft, and the cam in the storage position of the contact strip device being able to be brought into contact at a first contact surface by being transferred to the locking position on the current collector in a manner that movement of the contact strip device is blocked relative to the conductor rail, and rotational movement of the shaft for securing the cam in the release or locking position being positively blocked of the anti-rotation device.

18 Claims, 5 Drawing Sheets

LOCKING DEVICE FOR A PANTOGRAPH

This patent application claims priority of the European Patent Application No. 22186313.7 filed on Jul. 21, 2022, the disclosure of which is incorporated herein by reference.

The invention relates to a locking device and a method for locking a contact strip device of a current collector in a storage position, the contact strip device being movable between a storage position and a sliding contact position relative to a conductor rail.

Current collectors and methods for operating a current collector with a contact strip device, the contact strip of which is pressed against a conductor rail in a sliding contact position, are sufficiently known from the prior art and are regularly used in rail vehicles for transmitting electrical energy from a conductor rail to a rail vehicle. The conductor rail is usually disposed in the area of the running rails and is also referred to as the third rail. In known current collectors, a contact strip is disposed on a rocker or rocker arm or a guide formed from joints, which serves to fasten and move the contact strip relative to the conductor rail. By means of this mechanical suspension of the contact strip, the contact strip can be pressed against a sliding contact surface of the conductor rail using a defined pressure force and thus be transferred into a sliding contact position. A distinction is made here between conductor rails and current collectors whose contact strip is pressed in sliding contact position against an upper side of the conductor rail, against a lower side of the current collector or against a side surface of the conductor rail. The contact strip can be contacted with the conductor rail by moving the contact strip up or down onto the conductor rail, usually via a start-up ramp, the rocker or joint guide then being able to be pressed back over the contact strip and thus the required contact pressure being able to be applied by a spring element. The spring element can be designed as a mechanical torsion spring, helical spring or rubber spring.

In addition, the contact strip device can be transferred from the sliding contact position to a storage position by means of the rocker or rocker arm or the guide formed by joints, for example if the rail vehicle is to be supplied with power in a different manner. For example, extended use of rail networks with vehicles which have corresponding current collectors may make it necessary to switch between different power supply systems when these rail vehicles travel across networks. Therefore, the rail vehicles concerned may be equipped with further current collectors for deviating power rail systems in order to make them usable for the respective rail routes. It may therefore be the case that no power transmission is to take place with a current collector, so that the relevant current collector or its contact strip device must be disconnected from the conductor rail and transferred to a storage position on the rail vehicle. Even if only a part of the current collectors of a rail vehicle is to be used for power transmission, it is appropriate to separate the unused current collectors or contact strips from the relevant conductor rail in order to avoid unnecessary wear of the respective contact strips.

Known current collectors often have a pressure device for the contact strip device, the pressure device pressing the contact strip against the conductor rail in the sliding contact position of the contact strip and compensating movements of the rail vehicle and minimizing mechanical overstressing of the contact strip, for example caused by impacts due to high speed. However, it is also necessary to securely hold the contact strip device on the rail vehicle in the storage position to prevent unlocking due to loads caused by the operation of the rail vehicle and unintentional transfer of the contact strip device from the storage position to the sliding contact position.

The object of the invention is therefore to propose a device and a method which both enable simple and safe locking of the contact strip device of a current collector in the storage position.

This object is attained by a locking device as disclosed, a current collector as disclosed herein and a method as disclosed herein.

Advantageous embodiments of the invention are the subject of the dependent claims. Also within the scope of the invention are all combinations of at least two features disclosed in the description, the claims and/or the figures.

The locking device according to the invention for securing a contact strip device of a current collector in a storage position, the contact strip device being movable between a storage position and a sliding contact position relative to a conductor rail, has a cam, a rotatably mounted shaft and an anti-rotation device. According to the invention, the cam is disposed on the shaft in a rotationally fixed manner and is movable from a release position of the cam, in which the cam releases a movement of the contact strip device, to a locking position of the cam, in which the cam supports the contact strip device in the storage position, by rotation of the shaft. Provided the contact strip of the contact strip device is separated from the conductor rail and the contract strip device has been transferred to the storage position, the cam can be transferred to the locking position of the cam by rotation of the shaft. In the locking position, the cam abuts against the current collector, preferably against a rocker unit of the current collector, at a first contact surface in such a manner that a movement of the contact strip device is blocked relative to the conductor rail. In other words, the cam prevents the contact strip from returning from the storage position to the sliding contact position by contacting the current collector with its first contact surface. To secure the cam in the release position or locking position, the rotational movement of the shaft is positively locked by means of the anti-rotation device. Thus, the cooperation of the anti-rotation device, cam and shaft according to the invention makes it possible to secure the contact strip device in the storage position by securing the cam in the locking position and blocking the rotational movement of the shaft.

Preferably, the locking device according to the invention is disposed on a current collector which comprises a pressure device with a contact strip device, the contact strip of which forms a sliding contact surface, and a rocker unit, wherein a pressure force is formed on the contact strip device disposed on the rocker by means of a pivotably designed rocker of the rocker unit and a spring element of the pressure device, as a result of which the contact strip can be moved relative to a conductor rail and can be pressed against the conductor rail into a sliding contact position using a required pressure force in order to form a sliding contact. The rocker unit of the pressure device can be designed to be rotatable so that the unloaded rocker having the contact strip device attached to it can be brought from a storage position into a sliding contact position against the conductor rail. The required pressure force can be applied by a spring element. The spring element may have a mechanical, pneumatic or hydraulic spring element which is suitable for mustering the contact pressure force. Accordingly, the rocker unit enables movement of the contact strip or contact strip device between the sliding contact position and the storage position. The rocker of the rocker unit can thereby be pivotally mounted at a simple pivot joint or can also be formed from a plurality of joints, which in turn are each mounted at a pivot point. It is conceivable that the locking device according to the invention is disposed on the rocker unit of the current collector and the cam of the locking device in the locking position supports the rocker unit of the current collector in such a manner that the contact strip device is secured in the storage position.

In the context of the invention, the term "anti-rotation device" is understood to mean any device which reliably blocks rotation of the shaft of the locking device about its rotational axis by forming a positive connection. This is because a positive connection in particular can permit a high transmissibility of forces as well as a simple release of the connection in order to release the shaft again. Thus, the cam can be secured in its release position or locking position by forming the positive connection between the anti-rotation device and the shaft on which the cam is disposed in a rotationally fixed manner and, in addition, the shaft can be released again by cancelling the positive connection between the anti-rotation device and the shaft in order to transfer the cam from the release position to the locking position or from the locking position to the release position.

The anti-rotation device may have a pin disposed inside the shaft along the rotational axis of the shaft, a bolt and a bushing fixed with respect to the shaft. In order to be able to block a rotational movement as required, the bolt can be introduced into the pin perpendicular to the rotational axis of the shaft and inserted into a recess of the bushing, which at least partially surrounds the shaft and the pin, positive connection between the bolt and the bushing is formed. Preferably, the bolt can be inserted into the at least one recess of the bushing along the rotational axis of the shaft to form the positive connection between the bolt and the bushing. It is conceivable that the rotational axis of the shaft and the longitudinal axis of the pin disposed inside the shaft coincide. In order to achieve a particularly reliable securing of the rotational movement of the shaft, the bolt can engage through both the shaft and the pin.

It is understandable to the skilled person that in order to transfer the cam from the locking position to the release position or from the release position to the locking position, the shaft must be disposed rotationally movable within the bushing when at least partially engaging around the bushing of the shaft. The bushing itself can be fixed to a further component of the locking device, the current collector or the rail vehicle independently of the shaft to enable the locking of the rotational movement of the shaft via the bolt. Thus, advantageously for blocking the rotational movement of the shaft, the bolt engages positively in a recess of the fixed bushing, whereby the bolt can be engaged or disengaged by means of the pin, preferably by displacing the pin within the shaft along the rotational axis of the shaft or against the rotational axis of the shaft.

It is particularly advantageous if the pin is spring-mounted within the shaft and can be displaced along the rotational axis of the shaft against the spring force. Preferably, locking of the shaft then takes place by displacing the pin against the spring force along the rotational axis of the shaft, while locking of the shaft can take place by displacing the pin and by inserting the bolt into the recesses of the bushing due to the spring force. The bolt connected to the pin can engage or snap into the at least one recess of the bushing due to the spring force.

It has further proved advantageous if the bolt inserted in the pin can be displaced within a groove made in the shaft. Advantageously, the groove limits the path of the bolt and thus also of the pin within the shaft. Preferably, two grooves made in the shaft, which are offset by 180° over the outer circumference of the shaft, limit the path of a bolt passing through the shaft.

Along the circumference of the bushing, at least two recesses may be disposed for locking the cam in the locking position and/or the release position. The locking position and the release position or the path length between the locking position and the release position can be defined as a function of the position of the recesses on the outer circumference of the bushing. Preferably, at least two recesses are disposed at an offset to each other at an angle of 90 degrees over the outer circumference of the bushing. This allows the cam to be locked in the release position, for example, when engaged in the first recess and to be locked in the locking position after being displaced by 90 degrees when engaged in the second recess. In other words, the cam can be fixed in each case after rotation of the cam by 90°. Further preferably, four recesses are evenly distributed around the outer circumference of the bushing, i.e., at a distance of 90 degrees to each other in the case of a cylindrical bushing surrounding the shaft. Thus, a bolt passing through the shaft can engage in two recesses disposed opposite each other simultaneously to lock the rotational movements of the shaft and fixing a position of the cam. For easy insertion of the bolt into the recesses, the recesses can be designed like a slot.

If the recess has at least one insertion slope by means of which the bolt can be introduced into the recess, the bolt can slide into the recess in a simple manner and with minimal resistance when the position of the cam is altered. Preferably, an insertion slope is formed in the manner of a chamfer.

To further secure the contact strip device in the storage position, the cam can be brought into contact with a second contact surface on the current collector and/or on a housing of the locking device and/or on a holding device of the locking device. In this manner, forces, in particular forces transmitted to the contact strip device and/or the rocker unit due to accelerations, can be transmitted to a housing of the locking device or to the current collector, in particular its support device or pressure device, or to the rail vehicle. It is conceivable that the holding device forms part of the housing of the locking device and/or is connected to the housing.

The rotational axis of the shaft and the rotational axis of the rocker unit can be parallel and/or spaced apart. Preferably, the rotational axis of the shaft of the locking device runs parallel to the rotational axis of the rocker unit and is spaced apart from it.

A mounting plate can be disposed on the bushing for mounting, in particular for rotationally fixed mounting, of the bushing with respect to the shaft of the locking device. The fastening plate can be disposed using a detachable connection, preferably a screw connection, on a holding device of the locking device. The holding device of the locking device is connected to the current collector and/or the rail vehicle on which the locking device is disposed. It has proved advantageous if the holding device also supports the shaft of the locking device. It is conceivable that the holding device of the locking device is at least partially formed by a component of the current collector, for example its pressing device or support device. According to a preferred embodiment of the mounting plate, the mounting plate has two eyes, one of which surrounds the shaft and the other serves for the passage of a connecting means, preferably a screw. According to this embodiment, the bushing is disposed on the first eye of the fastening plate, which surrounds the shaft, in such a manner that the shaft passes through the bushing and the fastening plate. Washers can be used for a fine adjustment of the fastening plate and for alignment with respect to the holding device, in particular when fastening takes place by means of a screw connection. In addition, washers can increase the security of the detachable connection.

For easy operation of the anti-rotation device of the locking device, the shaft may have a prismatic outer contour at one end, preferably in the shape of a square. A tool complementary to the prismatic outer contour of the shaft, such as a wrench or nut complementary to the prismatic outer contour, may be used to actuate the shaft and thus the cam. Preferably, the pin is inserted into one end of the shaft, preferably the prismatic outer contour being provided on the shaft at the end into which the pin is inserted. Further preferably, the portion of the shaft between the bushing or mounting plate and the shaft end or shaft face has the prismatic outer contour. As a result, the prismatic outer contour can simultaneously form a stop for the bushing and/or the mounting plate.

It is conceivable that the pin may protrude beyond a shaft end face or an end of the shaft when the rotational movement of the shaft is locked along the rotational axis of the shaft. By actuating the protruding end of the pin, in particular by pushing the protruding end of the pin into the shaft, the positive locking between the bolt and the bushing can be released by guiding the bolt out of the at least one recess of the bushing. Advantageously, the condition of the anti-rotation device can also be detected via simple visual inspection on the basis of the pin section projecting beyond the shaft. If the pin projects beyond the shaft, the pin is in positive engagement with the recesses of the bushing and a rotational movement of the shaft is blocked. Accordingly, rotational movement of the shaft is enabled if the pin is inserted into the shaft and therefore there is no positive engagement between the bolt and the recesses of the bushing. Preferably, the length of the bore, which is made in the shaft to receive the pin, corresponds at least to the length of the pin. Accordingly, the path of movement of the pin within the shaft corresponds at least to the length of the pin section projecting beyond the shaft face end. The portion of the pin projecting beyond the face of the shaft when the rotational movement of the shaft is blocked may have a smaller diameter or a different cross-section than the remainder of the pin, and thus may be referred to as the pin extension. Further preferably, when the rotational movement of the shaft is locked along the rotational axis of the shaft, the pin projects beyond the shaft end face, at the end of which the shaft has a prismatic outer contour. Advantageously, a tool designed complementarily to the prismatic outer contour of the shaft can then be placed on the prismatic outer contour and, at the same time, the pin can be pushed into the shaft using this tool to release the rotational movement of the shaft, in order to adjust the cam using the tool by rotating the shaft.

To protect the anti-rotation device, the locking device may comprise an anti-rotation housing disposed on the outer circumference of the shaft. To ensure the protection of the anti-rotation device, the anti-rotation housing should at least partially surround the anti-rotation device and thus protect it from external influences, such as dust, abrasion, lubricants and/or fluids. Preferably, the anti-rotation housing surrounds the bushing or bolt. Further preferably, the anti-rotation housing surrounds the bushing and the pin. Conceivably, the anti-rotation housing is cylindrical in shape and can be slid onto both the shaft and the bushing. Further, the anti-rotation housing can be inserted into the recess of the holding device in which the bushing and the shaft are also disposed. To prevent unintentional displacement of the anti-rotation housing along the rotation axis of the shaft, the cam can serve as a stop on one side of the anti-rotation device and the retaining device as a stop on the other side of the anti-rotation device.

For securely connecting the cam to the shaft, the cam can be disposed on the shaft in a rotationally fixed manner by means of a screw connection passing through the shaft.

The current collector according to the invention for transmitting power from a conductor rail to a vehicle comprises a locking device according to invention, the current collector comprising a support device, a contact strip device and a pressure device having a rocker unit. The support device serves to fasten the current collector to the vehicle. The contact strip device of the current collector is movable relative to the conductor rail by means of the pressure device and can be pressed against the conductor rail in a sliding contact position using a pressure force in order to form a sliding contact.

In the method for securing a contact strip device of a current collector, which is movable between a storage position and a sliding contact position relative to a conductor rail, in the storage position by means of a locking device, which has at least one cam, a rotatably mounted shaft and an anti-rotation device, a rotational movement of the shaft can be released by means of the anti-rotation device in order to displace the cam disposed in a rotationally fixed manner on the shaft, and subsequently, after the contact strip device has been moved to the storage position, the cam can be transferred from a release position into a locking position by rotation of the shaft and can be brought into contact at a first contact surface at the current collector, preferably at a rocker unit of the current collector, in such a manner that a movement of the contact strip device is blocked relative to the current collector. After the contact strip device has been transferred into the storage position and the cam has been transferred from a release position into a locking position, the rotational movement of the shaft for securing the cam in the locking position can be positively blocked by means of the anti-rotation device.

Further advantageous embodiments of the method result from the feature descriptions of the device described and claimed herein. Likewise, all features and embodiments disclosed for the device refer in an equivalent, even if not identical, manner to the method according to the invention. In this context, it is understood in particular that customary linguistic transformations and/or a synonymous substitution of respective terms within the scope of customary linguistic practice, in particular, the use of synonyms supported by the generally accepted linguistic literature is encompassed by the present disclosure, without being explicitly mentioned in their respective formulations.

It is understood that the embodiments and examples of embodiments mentioned above, which are still to be explained below, can be formed not only individually, but also in any combination with each other, without leaving the scope of the present invention. It is likewise understood that the embodiments and examples of embodiments mentioned above and still to be explained below relate in an equivalent or at least similar manner to the method according to the invention, without being mentioned separately for the latter.

Embodiments of the invention are shown schematically in the drawings and are explained below exemplarily.

Figure 1:
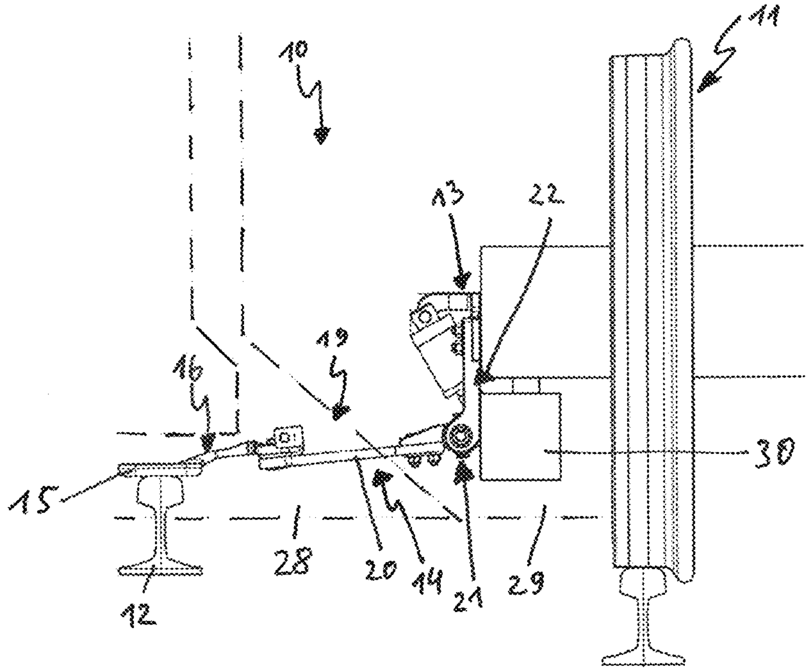
FIG. 1 shows a side view of a current collector having a contact strip device in the sliding contact position.
Figure 2:
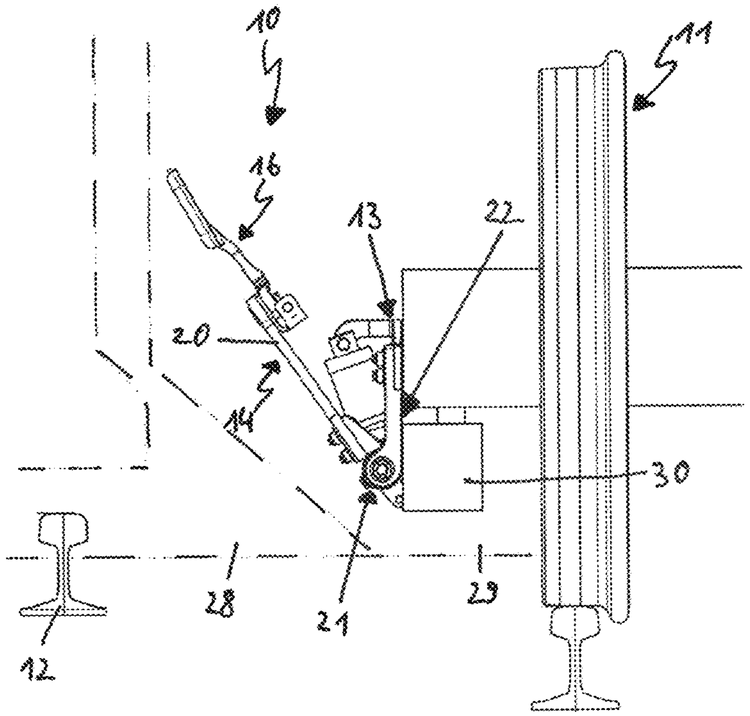
FIG. 2 shows a side view of the current collector from FIG. 1 having the contact strip device in the storage position.

A combined view of FIGS. 1 and 2 shows a current collector 10 between wheels 11 of a rail vehicle (not shown in greater detail) on a conductor rail 12. The current collector 10 comprises a support device 13 and a pressure device 14 as well as a contact strip device 16 having a contact strip 15. The support device 13 serves to fasten the current collector in the vehicle (not shown in greater detail). The contact strip 15 is connected to the pressure device 14 and rests against the conductor rail 12 in the sliding contact position shown. In the embodiment shown here, a sliding contact surface of the contact strip 15 rests on a surface of the conductor rail 12 so that an electrical contact is established between the current collector 10 and the conductor rail 12. However, it is also conceivable that the contact strip 15 is brought into contact with the conductor rail 12 from below the conductor rail 12.

The pressure device 14 presses the contact strip 15 against the conductor rail 12 using a pressure force, wherein the pressure device 14 comprises a rocker unit 19 for forming the pressure force using a rocker 20 and a spring element 21. Further, the pressure device 14 comprises a fastening element 22 connecting the spring element 21 to the support device 13. The spring element 21 can be formed, for example, from a helical spring (not shown) and an axle, the helical spring being connected to the axle in a rotationally fixed manner. The rocker unit 19 forms a rotatably mounted sleeve which surrounds the spring element 21 or the coil spring and the axle. In particular, the rocker 20 is disposed or screwed to the sleeve so that a rotation of the sleeve on the axle or coil spring causes the rocker 20 and the contact strip device 16 to pivot. The spring element 21 is designed so that the pressing force is exerted solely in the direction of the conductor rail. By means of the pivoting device of the rocker unit 19, the rocker 20 together with the contact strip device 16 can be moved between the sliding contact position and a storage position shown in FIG. 2. Relative to a cross section of the rail vehicle (not shown), the contact pressure device 14 with the contact strip device 16 is consequently located in an extended effective range 28 on the conductor rail 12 in the sliding contact position and in a reduced effective range 29 in the storage position. This makes it possible to reduce an effective cross section of the vehicle and thus prevent possible collisions with objects or structures. The possible uses of a rail vehicle of this kind on different rail tracks can then be substantially expanded in this manner.

Figure 3:
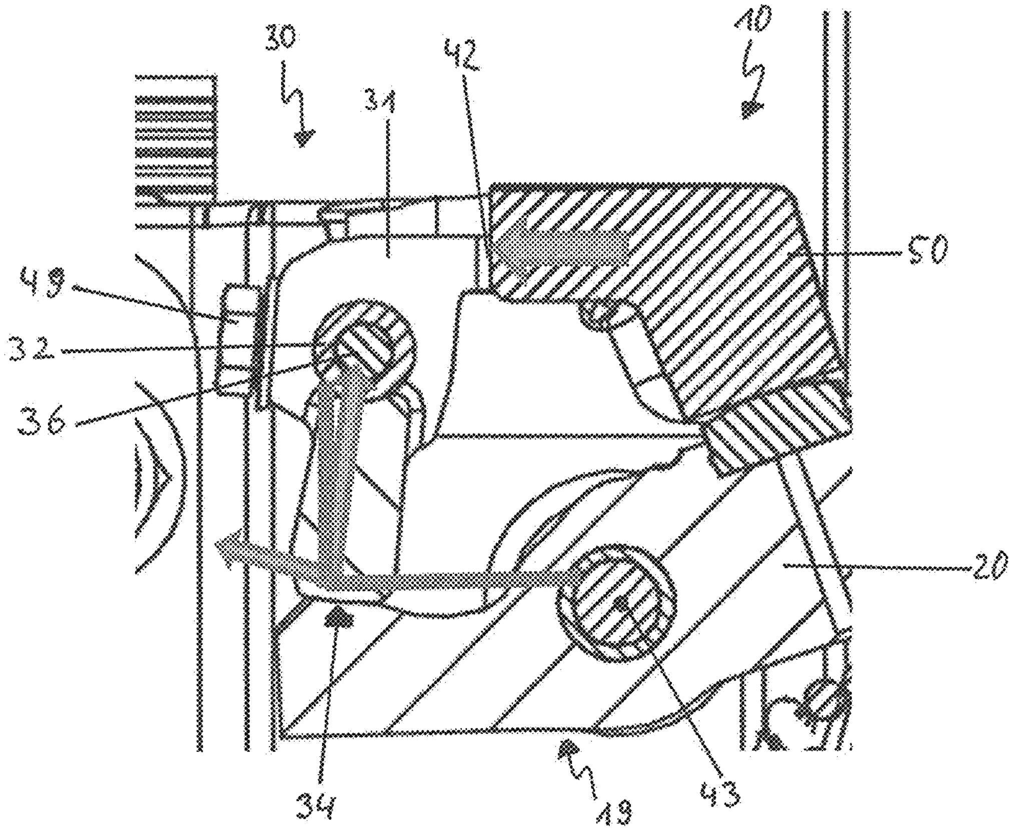
FIG. 3 shows a sectional view of a locking device according to the invention having a cam in the locking position.
Figure 4:
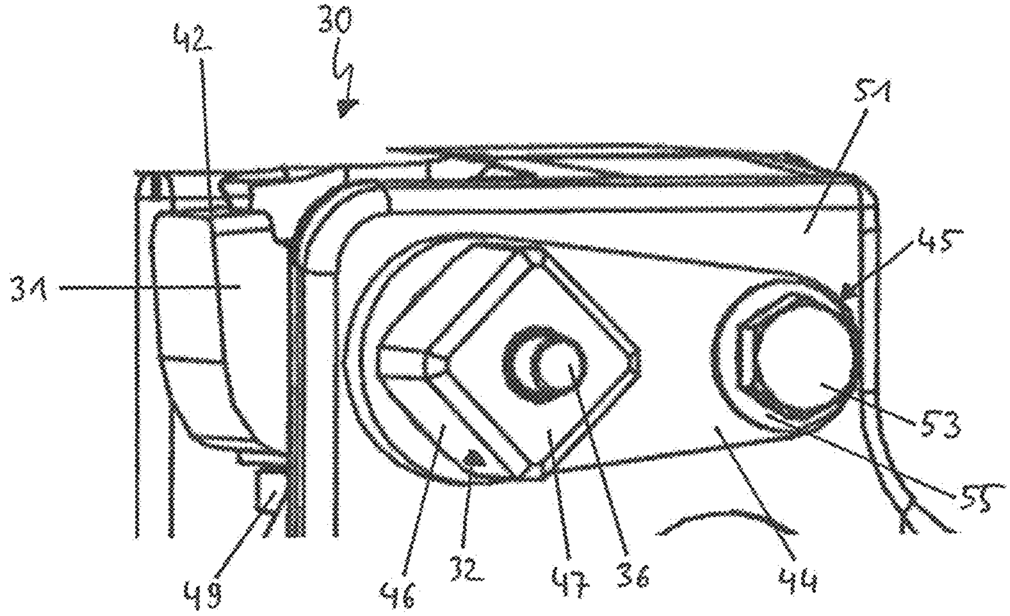
FIG. 4 shows an isometric view of a locking device according to the invention as shown in FIG. 3 in a sectional view having the cam in the release position.

From the combined view of FIGS. 3 and 4, the adjustment of the cam between a locking position and a release position is apparent, with FIG. 3 showing the cam in the locking position and FIG. 4 showing the cam 31 in the release position. It can be seen in the sectional view showing the locking device 30 according to the invention in FIG. 3 that the cam is brought into contact with the rocker 20 of the rocker unit 19 at a first contact surface 34 and supports this rocker unit 19, which is rotatable about the rotational axis 43, in the storage position. For additional securing of the rocker unit 19 in the storage position, the cam 31 comes into contact with a second contact surface 42 on a housing 50 of the locking device 30. Since the cam 31 is non-rotatably connected to the shaft 32 via the screw connection 49, the cam 31 can be pivoted by rotating the shaft 32. In addition, the pin 36 guided within the shaft 32 is visible, the pin 36 projecting from the end face 47 of the shaft 32 when the shaft 32 is locked against rotation. In order to be able to operate the locking device 30 by means of a simple tool, the end of the shaft 32 from which the pin 36 projects is provided with a prismatic outer contour 46, presently in the form of a square. In particular, it can be seen from FIG. 4 that the bushing 38, (not shown) on which the fastening plate 44 is disposed, is connected to the holding device 51 of the locking device 30 via the fastening plate 44 and a screw connection 45. For fine adjustment of the fastening plate 44 or the screw connection 45 with respect to the shaft 32 and the bushing 38, a washer 51 is disposed between the fastening plate 44 and the screw 53.

Figure 5:
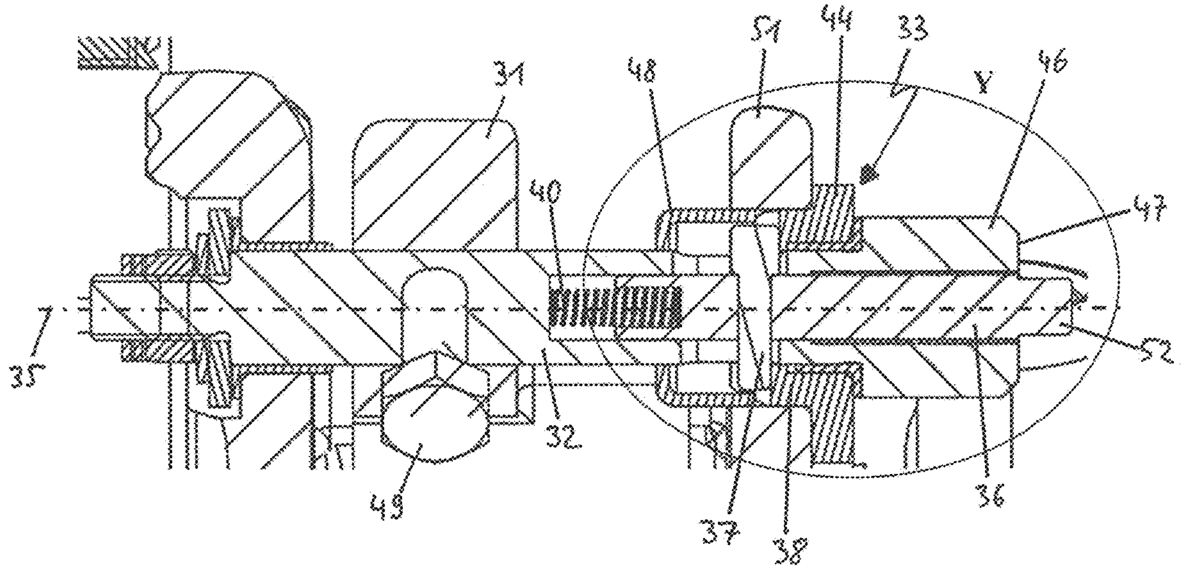
FIG. 5 shows a longitudinal section through a locking device according to the invention as shown in FIG. 3 having a shaft in the locked state.
Figure 6:
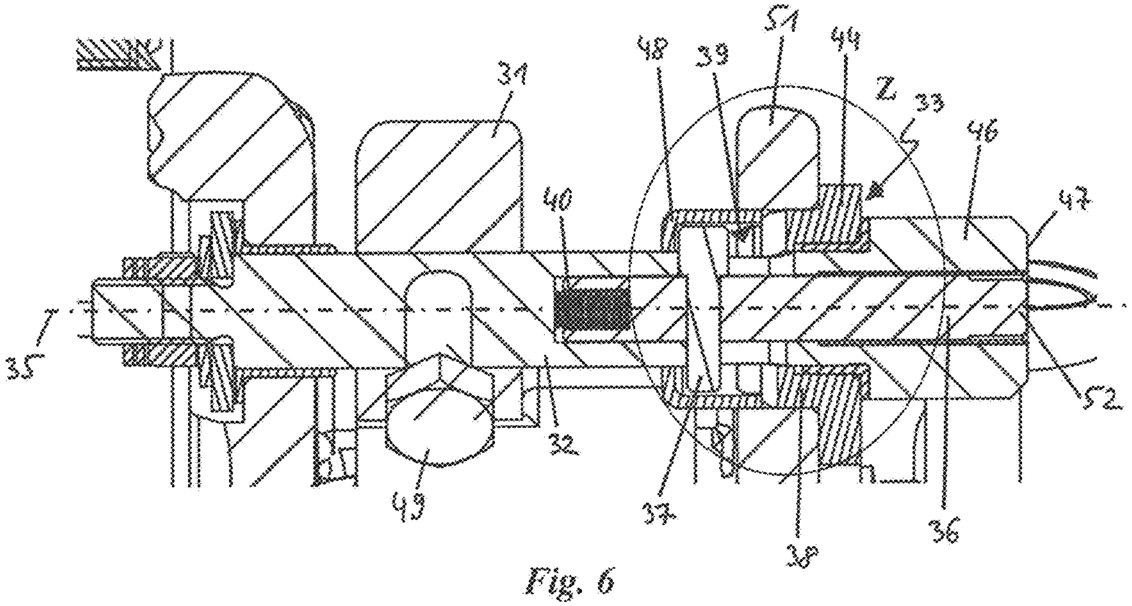
FIG. 6 shows a longitudinal section through the locking device from FIG. 5 having a shaft in the released state.
Figure 7:
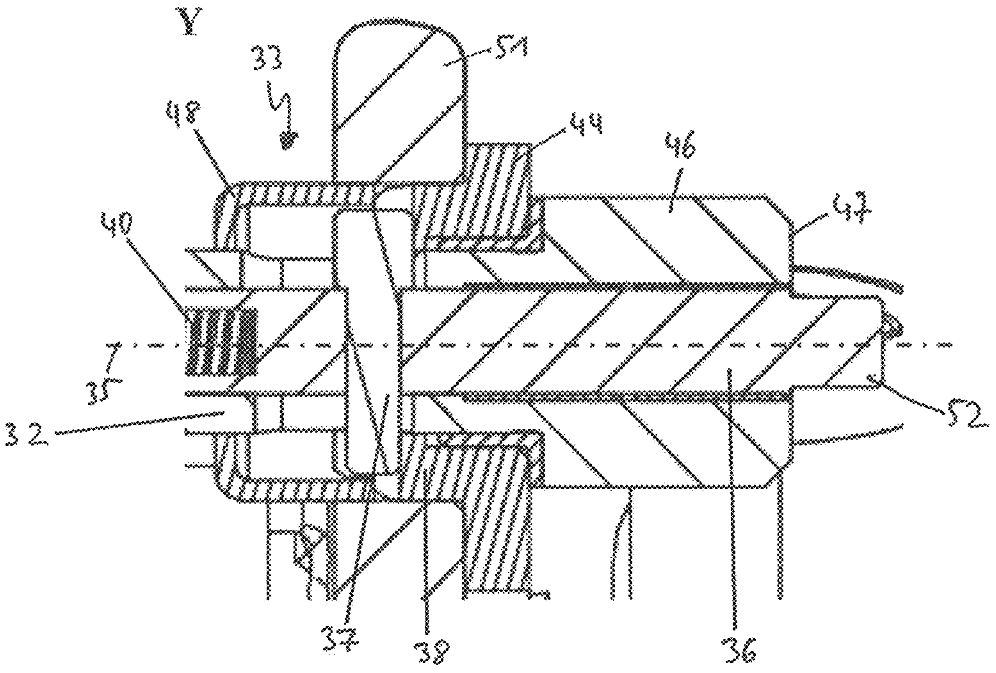
FIG. 7 shows detail Y of the locking device from FIG. 5.
Figure 8:
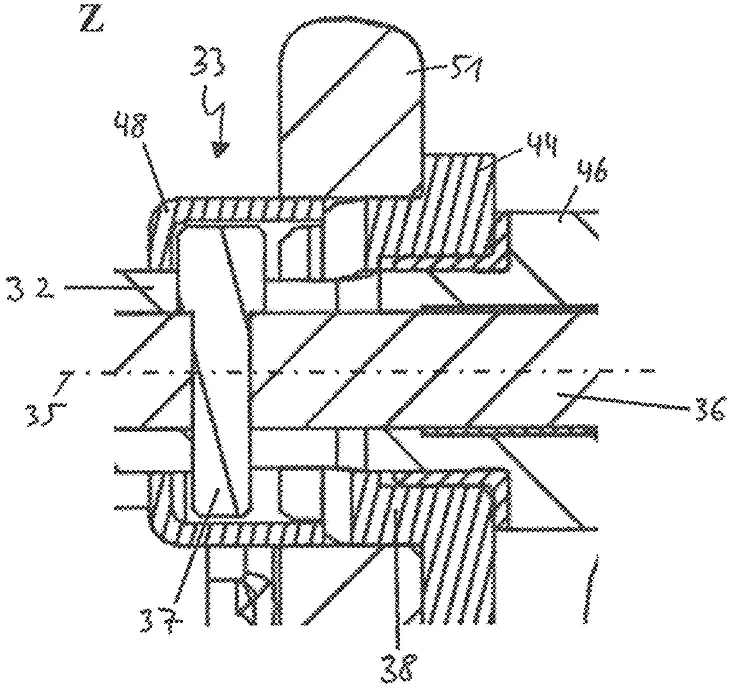
FIG. 8 shows detail Z of the locking device from FIG. 6.

A combined view of FIGS. 5 and 6 in conjunction with details Y and Z taken from FIGS. 5 and 6, which are shown in FIGS. 7 and 8, shows the function of locking and releasing the rotational movement of the shaft 32 can be seen. FIG. 5 shows the locking device 30 with a locked rotational movement of the shaft 32 while FIG. 6 shows the locking device 30 with a released rotational movement of the shaft 32. It can be seen that the shaft 32 is mounted rotatably about the rotational axis 35 and the cam 31, for displacement by means of the shaft 32, is disposed non-rotatably on the shaft 32 via a screw connection 49. The anti-rotation device 33 is essentially constructed from a bushing 38, a mounting plate 44 disposed thereon, a pin 36, a bolt 37, a spring 40 and an anti-rotation housing 48. The pin 36 is spring-loaded within the shaft 32 by means of the spring 40 and is slidable within the shaft 32 along the rotational axis of the shaft 32. The user can easily recognize that the rotation of the shaft 32 is locked in the condition shown in FIG. 5 because the pin 36 extends beyond the end face 47 of the shaft 32. The portion of the pin 36 projecting beyond the shaft end face 47 has a recognizably smaller diameter than the remaining portion of the pin 36, and thus can be referred to as the pin extension 52. When the rotational movement of the shaft 32 is locked, as shown in FIG. 5, the bolt 37 is positively inserted into the recesses 39 of the bushing 38 and locks a rotational movement of the shaft 32, since the bushing 38 is connected to the stationary holding device 51 via the mounting plate 44. In contrast, FIG. 6 shows the state of the anti-rotation device in which the rotational movement of the shaft 32 is released. The pin extension 52 is fully inserted into the shaft 32, allowing the pin 36 to be flush with the shaft end face 47 and allowing a user to visually identify that the rotational movement of the shaft 32 is released. The pin 36 can be inserted via the simply placement of a corresponding tool complementary to the prismatic outer contour 46 of the shaft 32, so that in addition to inserting the pin 36 into the shaft 32 using this tool, rotational movement of the shaft 32 can also be effected. By pushing the pin 36 into the shaft 32 against the spring force of the spring 40, the positive connection between the recesses 39 of the bushing 38 and bolt 37 is cancelled, since the bolt 37 is displaced along the rotational axis 35 together with the pin 36 and does not engage further in the recesses 39. After the pin 36 has been inserted into the shaft 32, a rotational movement of the shaft 32 can thus transfer the cam 31 from a locking position to a release position or from the release position to the locking position.

Figure 9:
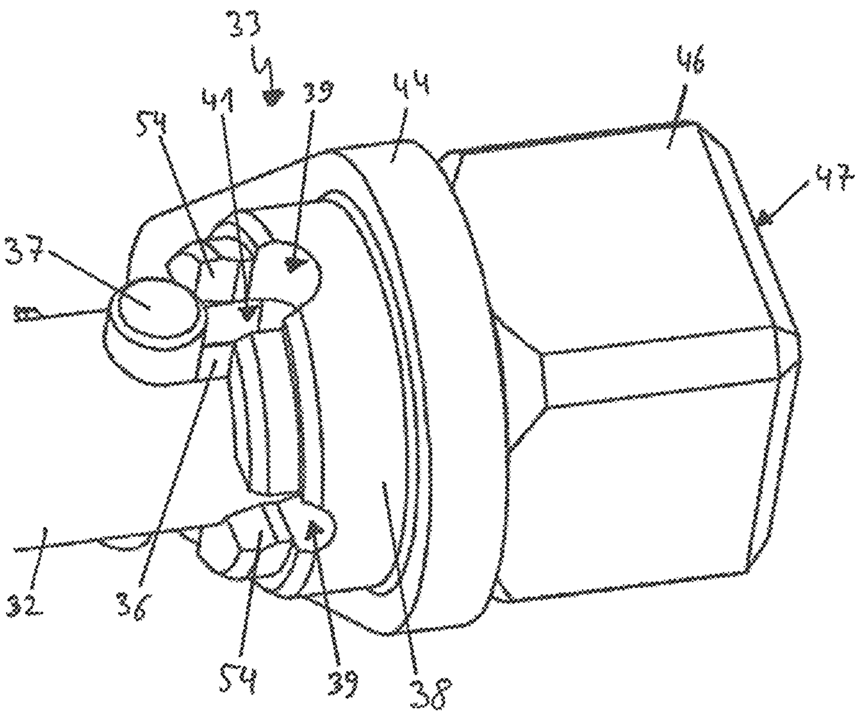
FIG. 9 shows an anti-rotation device of a locking device according to the invention in perspective view.

FIG. 9 shows a section of the shaft 32 having the anti-rotation device 33 disposed thereon; the illustrations of the anti-rotation housing 48 have been omitted for the sake of clarity. It can be seen that the shaft 32 has a prismatic outer contour 46 at one end portion, the prismatic outer contour 46 being able to be engaged by a tool (not shown). In the present case, the end section having the prismatic outer contour 46 extends from the shaft end face 47 to the fastening plate 44. According to the state of the anti-rotation device 33 shown in FIG. 9, a rotational movement of the shaft 32 is released, since the bolt 37 is disposed outside the recesses 39 and thus does not form a positive connection with the bushing 38. However, if the pin 36 is moved beyond the shaft end face 47 within the shaft 32 along the rotational axis 35 of the shaft 32 (not shown), then the bolt 37 passing through the pin 36 and the shaft 32 is displaced within the groove 41 and inserted into the recesses 39 of the bushing 38. The insertion of the pin 37 is greatly simplified by the insertion slopes 54. In addition, it can be seen in FIG. 9 that four recesses 39, at least two of which are visible, are disposed at an angle of 90° to one another across the outer circumference of the bushing 38. This means that the cam 31 is pivoted by 90° to be transferred from the release position to the locking position or from the locking position to the release position, since the position of the recesses does not permit locking of the rotational movement of the shaft 32 in any other position.

We claim:

1. A locking device for securing a contact strip device of a current collector in a storage position, the contact strip device being movable between a storage position and a sliding contact position relative to a conductor rail, the locking device comprising a cam, a rotatably mounted shaft and an anti-rotation device, the cam being disposed on the shaft in a rotationally fixed manner and the cam being movable from a release position to a locking position by rotation of the shaft and the cam in the storage position of the contact strip device being able to be brought into contact at a first contact surface by being transferred to the locking position on the current collector, in such a manner that a movement of the contact strip device is blocked relative to the conductor rail, and a rotational movement of the shaft for securing the cam in the release position or the locking position being positively blocked by the anti-rotation device, wherein the anti-rotation device has a pin disposed inside the shaft along a rotational axis of the shaft, a bolt and a bushing fixed with respect to the shaft, the bolt being introduced into the pin perpendicular to the rotational axis of the shaft, and the bolt being able to be inserted in a form-fitting manner into at least one recess of the bushing, which at least partially surrounds the shaft and the pin, in such a manner that a rotational movement of the shaft is blocked.

2. The locking device according to claim 1, wherein the pin is spring-mounted within the shaft and is displaceable along the rotational axis of the shaft against the spring force of a spring.

3. The locking device according to claim 1, wherein the pin inserted in the pin is displaceable within a groove made in the shaft.

4. The locking device according to claim 1, wherein at least two recesses are disposed along the circumference of the bushing for fixing the cam in the locking position and/or the release position.

5. The locking device according to claim 1, wherein the recess has at least one insertion slope.

6. The locking device according to claim 1, wherein the cam is brought into contact with a second contact surface on the current collector or on a housing of the locking device or on a holding device of the locking device.

7. The locking device according to claim 1, wherein the rotational axis of the shaft and the rotational axis of the rocker unit are parallel and/or spaced apart.

8. The locking device according to claim 1, wherein a fastening plate is disposed on the bushing, the fastening plate being disposed on a holding device by a detachable connection.

9. The locking device of claim 8, wherein the detachable connection is a screw connection.

10. The locking device according to claim 1, wherein the shaft has a prismatic outer contour at one end.

11. The locking device of claim 10, wherein the prismatic outer contour is in the form of a square.

12. The locking device according to claim 1, wherein the pin projects beyond a shaft end face when the rotational movement of the shaft is blocked along the rotational axis of the shaft.

13. The locking device according to claim 1, wherein an anti-rotation housing is disposed on the outer circumference of the shaft and at least partially encloses the anti-rotation device.

14. The locking device of claim 13, wherein the anti-rotation housing at least partially encloses a bushing and/or a bolt of the anti-rotation device.

15. The locking device according to claim 1, wherein the cam is disposed in a rotationally fixed manner on the shaft by a screw connection engaging through the shaft.

16. A current collector for transmitting power from a conductor rail to a vehicle, the current collector having a locking device according to claim 1, wherein the current collector comprises a contact strip device and a pressure device having a rocker unit, the contact strip device of the current collector being movable relative to the conductor rail by the pressure device and being capable of being pressed against the conductor rail in a sliding contact position using a pressure force in order to form a sliding contact.

17. The locking device according to claim 1, wherein the cam in the storage position of the contact strip device being able to be brought into contact at the first contact surface by being transferred to the locking position on the current collector is on a rocker unit of the current collector.

18. A method for securing a contact strip device of a current collector, which is movable between a storage position and a sliding contact position relative to a conductor rail, in the storage position by a locking device, which has at least one cam, a rotatably mounted shaft and an anti-rotation device, wherein a rotational movement of the shaft is released by the anti-rotation device in order to displace the cam disposed in a rotationally fixed manner on the shaft, and subsequently the cam in the storage position of the contact strip device is transferred from a release position into a locking position by rotation of the shaft and is brought into contact at a first contact surface at the current collector in such a manner that a movement of the contact strip device is blocked relative to the current collector, and further subsequently a rotational movement of the shaft for securing the cam in the locking position is positively blocked by the anti-rotation device, wherein the anti-rotation device has a pin disposed inside the shaft along a rotational axis of the shaft, a bolt and a bushing fixed with respect to the shaft, the bolt being introduced into the pin perpendicular to the rotational axis of the shaft, and the bolt being able to be inserted in a form-fitting manner into at least one recess of the bushing, which at least partially surrounds the shaft and the pin, in such a manner that a rotational movement of the shaft is blocked.

* * * * *